United States Patent [19]
Hagins

[11] 4,125,237
[45] Nov. 14, 1978

[54] WASTE PIPE SUPPORT

[76] Inventor: James H. Hagins, Rte. 8, Lancaster, S.C. 29720

[21] Appl. No.: 785,923

[22] Filed: Apr. 8, 1977

[51] Int. Cl.² .............................................. F16L 3/00
[52] U.S. Cl. ..................................... 248/49; 138/106; 248/75
[58] Field of Search ................. 248/49, 75, 80, 83–88, 248/58, 231, 222.4, 223.1, 224.4; 137/344; 138/106, 110, 107; 61/15

[56] References Cited

U.S. PATENT DOCUMENTS

| | | | |
|---|---|---|---|
| 1,341,198 | 5/1920 | Ruple | 248/222.4 X |
| 2,034,558 | 3/1936 | Bronson | 138/107 X |
| 3,406,933 | 10/1968 | Wait et al. | 248/80 |
| 3,496,959 | 2/1970 | Wolfe et al. | 137/344 |
| 3,623,500 | 11/1971 | Hoy | 137/344 |
| 3,809,348 | 5/1974 | Di Laura | 138/106 X |
| 3,882,886 | 5/1975 | Ely et al. | 248/75 X |
| 3,936,024 | 2/1976 | Jung | 248/49 X |

FOREIGN PATENT DOCUMENTS

| | | | |
|---|---|---|---|
| 1,309,340 | 10/1962 | France | 248/85 |

*Primary Examiner*—Rodney H. Bonck
*Attorney, Agent, or Firm*—Bailey, Dority & Flint

[57] ABSTRACT

An external waste pipe support for supporting an elongated flexible pipe which is adapted to extend from a fixed pipe carried on a trailer home such as a travel or portable trailer to a dumping receptacle. The support includes a bracket which extends downwardly from a rigid pipe carried by the trailer and a plurality of linkages that are connected together for supporting the flexible waste hose so that the waste can drain by gravity from the trailer into a dumping receptacle.

2 Claims, 5 Drawing Figures

U.S. Patent  Nov. 14, 1978  4,125,237
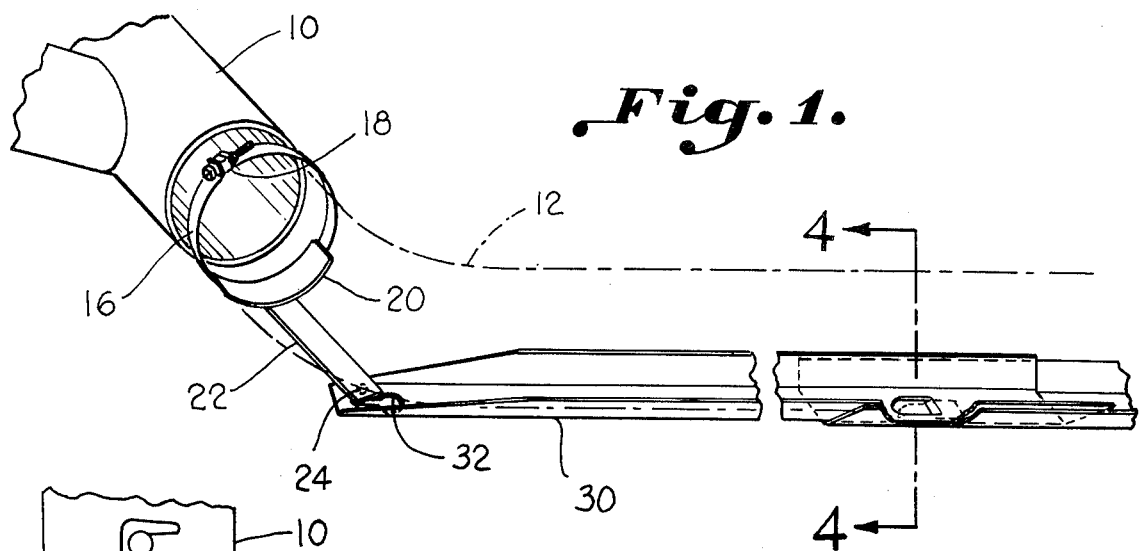
*Fig. 1.*
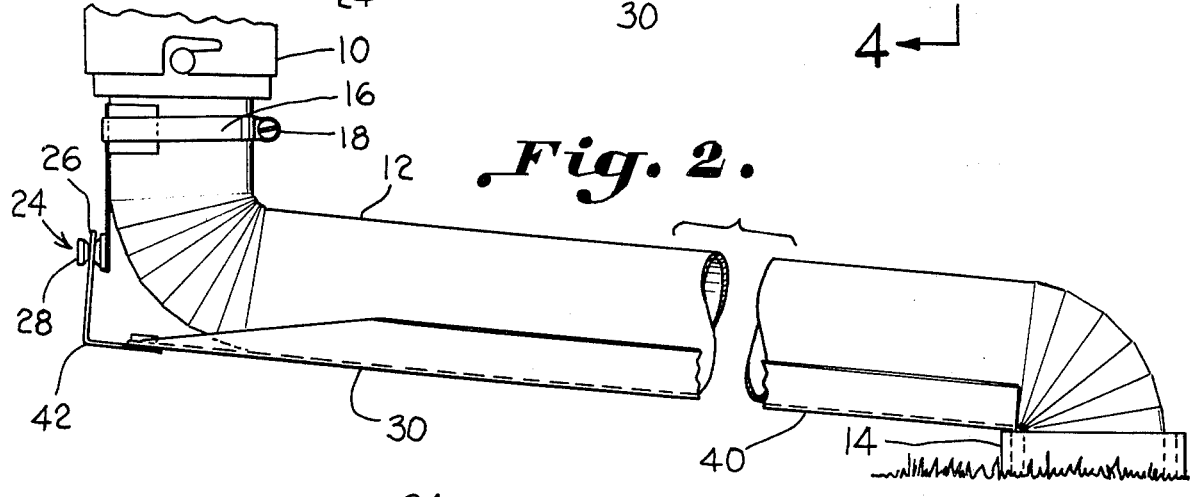
*Fig. 2.*
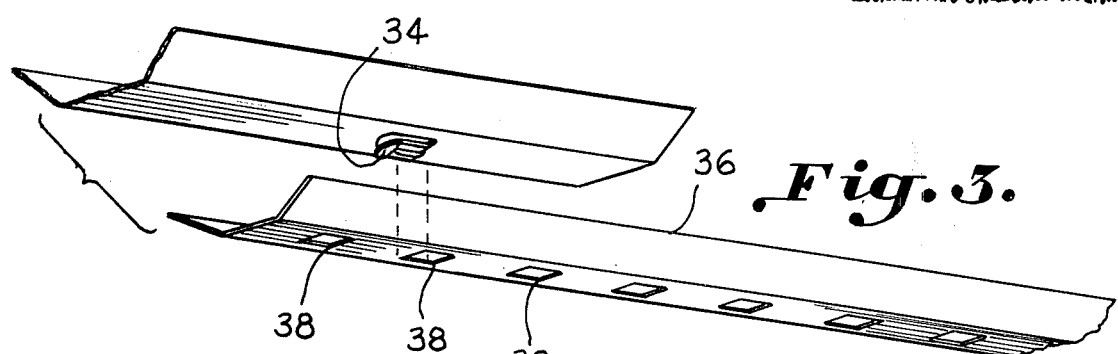
*Fig. 3.*
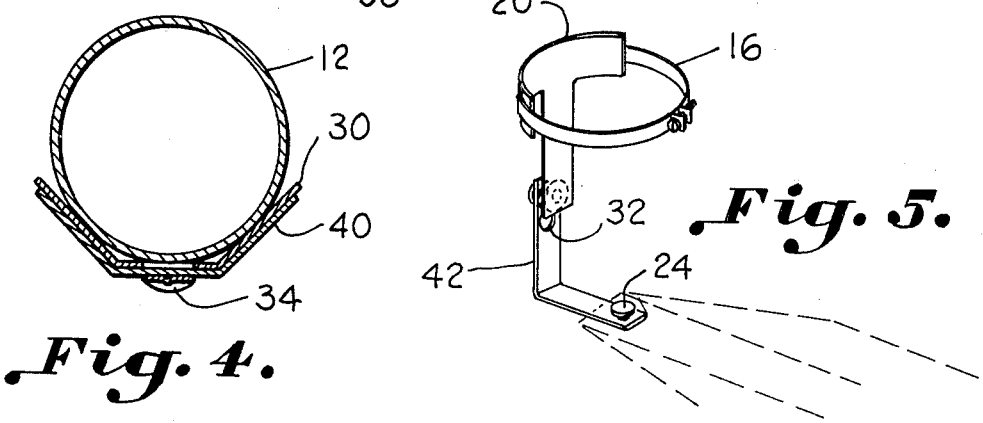
*Fig. 4.*
*Fig. 5.*

WASTE PIPE SUPPORT

BACKGROUND OF THE INVENTION

The present invention relates to an external waste pipe support and, more particularly, to a supporting device which supports a flexible pipe extending from a rigid pipe connected to a sewage tank of a trailer to a dumping receptacle.

Normally, trailer homes such as travel or portable trailers have receptacle tanks thereon for accumulating sewage wastes. These tanks require periodic dumping and normally they are dumped by means of connecting a flexible pipe from the waste collection tank and feeding the other end into a dumping receptacle. One problem encountered heretofore is that the flexible pipe would normally lie on the ground preventing gravitational flow through the entire length of the pipe to the receptacle.

In order to overcome this problem, several attempts have been made to provide stands for supporting the flexible hose on an incline between the trailer and the receptacle tank. Examples of such supporting devices are disclosed in U.S. Pat. Nos. 3,819,137, 3,572,622, 3,810,490, and 3,809,348. The devices disclosed in these patents show stands that are pressed into the ground using standards for supporting guide channels and the like on an incline so as to hold the flexible pipe at a desired delivery angle. One problem with devices such as illustrated in these patents is that they appear to be difficult to install and, after use, are cumbersome to store.

SUMMARY OF THE INVENTION

The invention pertains to an external waste pipe support for supporting an elongated flexible pipe on an angle so that waste from a sewage tank carried on a trailer home such as a travel or portable trailer can be conveniently dumped into a sewer receptacle. The external waste pipe support includes a mounting bracket which is normally attached adjacent a fixed pipe extending downwardly from the trailer. A first elongated member is adapted to be connected to the mounting bracket by means of a quick connector. The first elongated channel member has a connecting flange member positioned adjacent its remote end which is adapted to be inserted in a slot of an intermediate elongated channel shaped member. An end channel shaped member also has a connecting flange member so that it can be readily attached to the elongated intermediate channel shaped member.

An opening is provided adjacent the remote end of the end shaped channel member so that additional end channel shaped members can attach thereto for increasing the overall length of the support.

Accordingly, it is an object of the present invention to provide an external waste pipe support for supporting an elongated flexible pipe extending from a waste disposal tank carried on a trailer to a dumping receptacle.

Another important object of the present invention is to provide an external waste pipe support which can be readily assembled to any desired length for accommodating and supporting a flexible hose between a waste collection tank of a trailer and a dumping receptacle.

Still another important object of the present invention is to provide a simple and relatively inexpensive waste pipe support for supporting flexible pipes extending from a trailer to a dumping station so that the waste can flow from a waste disposal tank by means of gravity into a dumping receptacle.

These and other objects and advantages of the invention will become apparent upon reference to the following specification, attendant claims and drawing.

BRIEF DESCRIPTION OF THE DRAWING

FIG. 1 is a side view illustrating a portion of an external waste pipe support constructed in accordance with the present invention.

FIG. 2 is a side view illustrating an external waste pipe support having a different mounting bracket than that illustrated in FIG. 1.

FIG. 3 is an enlarged, perspective view showing the manner in which various lengths of a waste pipe support can be connected together.

FIG. 4 is a sectional view taken along line 4—4 of FIG. 1.

FIG. 5 is a perspective view illustrating one type of bracket that may be utilized for connecting an external waste pipe support to a rigid pipe connected to a sewage tank of a trailer or the like.

DESCRIPTION OF A PREFERRED EMBODIMENT

Referring in more detail to FIG. 1 of the drawing, there is illustrated a portion of a rigid pipe 10 which extends from the bottom of a sewage collection tank provided in a travel home such as a travel or portable trailer. Normally, these trailers collect the sewage over a period of time and then must be dumped into a dumping receptacle such as a septic tank. The trailers are provided with an elongated flexible hose 12 which is adapted to be connected to the rigid pipe by any suitable means for delivering the waste from the sewage tank into a pipe 14 which, in turn, communicates with a dumping receptacle. Since the waste is allowed to flow out of the collection tank by gravity, it is important that the flexible pipe 12 be maintained on a gradual, downwardly extending incline so that the waste will flow freely through the flexible pipe 12. In FIG. 1, the rigid pipe 10 is illustrated as extending downwardly from the camper at an angle whereas in FIG. 2, the rigid pipe 10 extends vertically downwardly from the trailer. Two different types of brackets are illustrated in FIGS. 1 and 2 for securing the external waste pipe support to the rigid pipes 10.

In FIG. 1, a bracket including a circular band 16 is attached adjacent to the juncture of the flexible pipe 12 and the rigid pipe 10 by means of a bolt 18 extending through threaded flanges provided thereon. Positioned adjacent the lower surface of the bracket 16 is an arcuate member 20 which has an outwardly extending arm 22 attached thereto by any suitable means such as welding. A quick connector 24 is provided adjacent the remote end of the arm 22.

This quick connector 24 includes a post having a reduced diameter intermediate portion 26 and an enlarged circular head provided on the end thereof. In securing a first section 30 of the support to the bracket 16, the enlarged head 28 is inserted through a slot which includes an enlarged circular opening 32 and a reduced portion. When the head of the post 24 is inserted through the enlarged opening provided in the member 30 and the first member is shifted to the right as seen in FIGS. 1 and 2, the reduced diameter portion 28 of the post is guided into the slot for securing the first elongated channel shaped member 30 to the post.

Positioned adjacent the remote end of the first elongated channel shaped member 30 is a connecting flange 34 that is formed by punching out a portion of the bottom of the channel-shaped member 30 so as to displace the flange 34 below the bottom of the channel-shaped member.

An adjustable extension or intermediate channel-shaped member 36 is connected to the first elongated channel shaped member 30 by means of the connecting flange member 34. The intermediate channel shaped member 36 has a plurality of square holes 38 provided in the base thereof for receiving the connecting flange member 34 for attaching the intermediate elongated channel member 36 to the first elongated channel member 30. The overall length of the waste pipe support may be adjusted by inserting the flange member 34 into the desired hole 38 provided in the intermediate member 36. An end channel member 40 also has a connecting flange 34 provided adjacent the inner end thereof for being inserted through an opening 38 provided in the intermediate member 36 for connecting the two together. In normal operation, the flange 34 on the end member faces in the opposite direction from the flange 34 provided on the first member so that when you pull on the ends of the pipe support, the sections will be pulled tightly together. Additional end members 40 may be coupled together to extend the overall length of the waste pipe support.

As illustrated in FIG. 2, as a result of the rigidity of the pipe support and the connection between the bracket 16 carried on the rigid dump pipe 10, the flexible pipe is held in a downwardly inclined position so that the waste will flow by gravity from the dump pipe 10 to the dumping receptacle 14.

In some trailers, instead of the rigid pipe extending out at an angle as illustrated in FIG. 1, the pipe 10 extends vertically downwardly. In this particular application, an adapter in the form of an angle member 42 is utilized to enable the first elongated channel shaped member to be properly connected thereto. The adapter 42 has a slot 32 provided therein for receiving the posts 24 carried on the end of the bracket 16. A post 24 is provided on the remote end of the adapter 42 which is inserted in the slot 32 provided on the first elongated channel shaped member.

In order to connect the hose 12 to the rigid pipe 10 for use, it is only necessary to tighten up the bolt 18 which attaches the flexible pipe 12 to the rigid member 10. The elongated channel shaped members can be readily attached together as discussed and the overall length desired can be adjusted by inserting the flange member 34 through the appropriate hole 38 provided in the intermediate member 36.

While a preferred embodiment of the invention has been described using specific terms, such description is for illustrative purposes only, and it is to be understood that changes and variations may be made without departing from the spirit or scope of the following claims.

What is claimed is:

1. An external waste pipe support for supporting an elongated flexible pipe which is adapted to extend from a fixed pipe carried on a trailer home such as a travel or portable trailer to a dumping receptacle for conveying waste from a collection tank provided in said trailer to the dumping receptacle, said support comprising:
    a mounting bracket,
    means for attaching said mounting bracket adjacent a juncture of said elongated flexible hose and said fixed pipe carried by said trailer home,
    a quick connector carried adjacent a remote end of said bracket,
    a first elongated channel shaped member adapted to receive a portion of said elongated flexible hose,
    a cooperating quick connector carried on one end of said first elongated channel shaped member for connecting with said connector carried on said bracket,
    a connecting flange member carried adjacent the other end of said first elongated channel shaped member and projecting below a bottom surface of said first rigid elongated channel shaped member,
    an intermediate channel shaped member,
    a plurality of longitudinal spaced holes provided in a bottom portion of said intermediate channel shaped member for adjustably receiving said connecting flange member of said first channel shaped member for connecting said first channel shaped member to said intermediate channel shaped member,
    said flange member when connecting said first channel shaped member to said intermediate channel member presses against a bottom surface of said intermediate channel member forcing an upper surface of said intermediate channel shaped member flush against a bottom surface of said first channel shaped member providing a rigid connection therebetween,
    an end elongated channel shaped member,
    a connecting flange member carried adjacent one end of a bottom surface of said end channel shaped member for being inserted in a hole provided in said intermediate member for connecting said end channel shaped member to said intermediate channel shaped member,
    whereby said channel shaped members are connected together for supporting said flexible pipe from said trailer to said dumping receptacle.

2. The external waste pipe support as set forth in claim 1 wherein said quick connector comprises:
    an outwardly extending post having a reduced diameter intermediate portion and an enlarged head, and
    said cooperating quick connector including an elongated slot provided in a bottom portion of said first channel shaped member, said slot having an enlarged portion through which said head of said connector passes and a reduced portion having a width less than the diameter of said enlarged head so that said reduced diameter portion of said post is positioned in said reduced portion of said slot for securing said first channel shaped member to said bracket.

* * * * *